United States Patent
Fearing

[15] 3,666,843
[45] May 30, 1972

[54] ALKYLARYLPOLYOXYALKYLENE ALKYL OR ARYL PHOSPHATES

[72] Inventor: Ralph B. Fearing, Bardonia, N.Y.
[73] Assignee: Stauffer Chemical Company, New York, N.Y.
[22] Filed: Feb. 23, 1968
[21] Appl. No.: 707,415

[52] U.S. Cl.................................260/951, 8/142, 252/89, 260/925, 260/971
[51] Int. Cl..........................................C07f 9/18, D06l 1/04
[58] Field of Search..................................260/951

[56] References Cited

UNITED STATES PATENTS 3,277,217  10/1966  Nehmsmann et al. .............260/951 X
3,380,927  4/1968  Edelstein et al....................260/951 X

*Primary Examiner*—Charles B. Parker
*Assistant Examiner*—Anton H. Sutto
*Attorney*—Paul J. Juettner, Wayne C. Jaeschke and Martin Goldwasser

[57] ABSTRACT

Compounds of the formula:

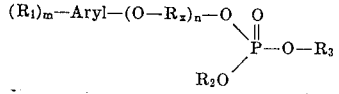

wherein $R_1$ is an alkyl radical of from one to 30 carbon atoms, $R_2$ is hydrogen, $R_x$ is an alkylene group of from two to six carbon atoms, $R_3$ is an alkyl radical of from one to 10 carbon atoms or phenyl, $n$ is an integer having a value of from 1 to 100, inclusive, $m$ is an integer having a value of from 1 to 2 inclusive, -Aryl- is phenylene, and naphthylene and the sodium, potassium, ammonium and ethanol amino salts thereof which are useful as detergents and surfactants.

10 Claims, No Drawings

ALKYLARYLPOLYOXYALKYLENE ALKYL OR ARYL PHOSPHATES

The present invention relates to novel high molecular weight monoalkylarylpolyoxyalkylene phosphates which are useful as detergents and surfactants.

In accordance with the present invention, there are provided novel monoalkylarylpolyoxyalkylene phosphates of the formula:

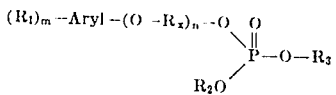

wherein $m$ is an integer having a value of from 1 to 2 inclusive; $R_1$ represents an alkyl radical, preferably of from six to 30 carbon atoms when $m$ is 1 and of from two to eight carbon atoms when $m$ is 2; $R_2$ is hydrogen or alkyl of from one to 10 carbon atoms, preferably hydrogen; $R_x$ is an alkylene group of from two to six carbon atoms; $R_3$ is an alkyl radical of from one to 10 carbon atoms or aryl; and $n$ is an integer having a value of from 1 to 100 inclusive.

The compounds of the present invention wherein $R_2$ is hydrogen and $R_3$ is alkyl can be prepared by esterifying an alkyl metaphosphate of the formula:

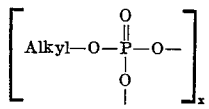

with an alkylarylpolyoxyalkylene glycol of the formula:

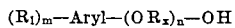

wherein $R_1$, $R_x$, Aryl, $m$ and $n$ are as defined above. The Alkyl group on the metaphosphate can be an alkyl group of from one to 10 carbon atoms such as methyl, ethyl, propyl, butyl, pentyl, hexyl, heptyl, octyl, nonyl and decyl. Preferably, the alkyl group is ethyl.

The esterification reaction is conducted under the following general conditions:

1. temperature — within the range of 60°–100° C.;
2. mole ratio — based on ethyl metaphosphate, about 0.5 to about 1.0 mole ethyl metaphosphate per mole of alkylarylpolyoxyalkylene glycol;
3. time — within the range of from about 0.5 to about 10 hours.

Utilizing the aforementioned method, a mixture of mixed esters is obtained. Generally the esterification mixture provides about 65 percent of the product of Formula I and lesser quantities of alkylarylpolyoxyalkylene glycol and alkyl acid phosphates. The compounds of Formula I can be separated from the reaction mixture and used as detergents or surfactants or the reaction mixture can be utilized in the same capacity.

The compounds of the present invention wherein $R_2$ is alkyl can be prepared by reacting a dialkylphosphorohalidate, such as dimethyl or diethyl phosphorochloridate, with the alkylarylpolyoxyalkylene glycol. The alkyl groups can be the same or different alkyl radicals of from 1 to 10 carbon atoms such as those enumerated above. The above reaction is generally conducted by adding approximately equimolar quantities of alkylarylpolyoxyalkylene glycol to the halidate with heating in the presence of a catalyst such as triethyl amine. The compounds of the present invention wherein $R_2$ is alkyl an $R_3$ is aryl can be similiarly prepared by reacting an alkyl arylphosphorohalidate, such as methylphenylphosphorochloridate with the alkyl arylpolyoxyalkylene glycol. Conditions of the reaction are preferably such that byproduct haloacid is isolated from the reactants as it is formed. In this regard, the triethyl amine catalyst performs a dual function.

The alkyl or dialkylarylpolyoxyalkylene glycols of the formula $(R_1)_m$-Aryl-$(OR_x)_n$OH are known materials and easily prepared by known prior art methods. These alkylene groups $R_x$ can be straight chain or branched chain, and preferably contain from two to six carbon atoms in a continuous chain connecting the oxygen atoms of the polyether omitting the carbon atoms in branched chains. As is known, the alkylene $R_x$ groups can be varied within the same polyoxyalkylene glycol portion of the compound. Illustrative of the various alkylene $R_x$ groups are: ethylene, propylene, isopropylene, butylene, pentylene, hexylene, heptylene, octylene and the like though ethylene is preferred. These are given as illustrative and applicant is in no way intended to be limited thereto.

The number of other units in the alkylaryloxyalkylene glycol can range from 1 to 100. Preferably and for detergent use, the number of ether units is maintained at an average of from about 4 to about 10 and more preferably from about 4 to about 8.

The aryl portion of the alkyl or dialkylarylpolyoxyalkylene glycol can be any phenylic type moiety which can be alkyoxylated to the polyoxyalkylene ether unit. Illustrative of such moieties are phenylene, napthylene, and non-alkyl substituted derivatives thereof.

The alkyl group of the alkyl or dialkyl arylpolyoxyalkylene glycol portion of the compound, e.g., $R_1$, when only one alkyl group is attached to the aryl group, can be any alkyl group but preferably an alkyl group having at least eight carbon atoms and more preferably from eight to 30 carbon atoms, when two alkyl groups are attached to the aryl group, the alkyl group preferably has at least four carbon atoms. Illustrative of the alkyl radicals are methyl, ethyl, propyl, and those of the preferred group are butyl, pentyl, hexyl, octyl, nonyl, decyl, hendecyl, dodecyl, tridecyl, tetradecyl, pentadecyl, hexadecyl, heptadecyl, octadecyl, nonadecyl, cicosyl, heneicosyl, docosyl, tricosyl, tetracosyl, pentacosyl, hexacosyl, heptacosyl, octacosyl, nonacosyl and tricontyl. Most preferably, the alkyl group is octyl or nonyl when one alkyl group is present on the aryl group and butyl or pentyl when two are present.

Salts of the compounds of the present invention are also useable as detergents. The salts can be formed by neutralizing the acidic hydrogen with a basic compound such as NaOH. Other salts can be formed using such bases as ethanol amine, potassium hydroxide, ammonium hydroxide, sodium carbonate and the like.

Illustrative of compounds of the present invention are: octylphenylhexa(oxyethylene)ethyl hydrogen phosphate, octylphenylnona(oxyethylene)ethyl hydrogen phosphate, nonylphenyltetra(oxyethylene)ethyl hydrogen phosphate, nonylphenylhexa(oxyethylene)ethyl hydrogen phosphate, octylphenylhexa-(oxyethylene)dibutyl phosphate, nonylphenylhexa(oxypropylene) dipentyl phosphate, ethylphenylhexa(oxyethylene)octyl hydrogen phosphate, eicosylphenyldi(oxyethylene)ethyl hydrogen phosphate, triacontylphenyldi(oxyethylene)ethyl hydrogen phosphate, octyl-1,4-napthylhexa(oxyethylene)ethyl hydrogen phosphate, octylphenyltetra(pentylene)ethyl hydrogen phosphate.

The compounds of the present invention are useful as detergents and surfactants, and especially for dry-cleaning detergents.

The invention is further illustrated in the examples which follow.

EXAMPLE 1

Isooctylphenylnona(oxyethylene)ethyl hydrogen phosphate is prepared by admixing 300 grams (0.5 mole) of isooctylphenylnonaoxyethylene glycol and 54 grams (0.5 mole) of ethyl metaphosphate in a reaction vessel and heating the same for 3½ hours at 70° C. Titration of separated product with 0.1 normal sodium hydroxide showed a yield of 62 percent.

EXAMPLE 2

Nonylphenyltetra(oxyethylene)ethyl hydrogen phosphate is prepared by admixing 22 grams (0.2 mole) of ethyl metaphosphate and 101 grams (0.25 mole) of nonylphenyltetra (oxyethylene) glycol and heating the same to 100° C. for 1½ hours. Titration with 0.1 normal sodium hydroxide showed that 0.128 mole of product was formed or a 64 percent yield.

EXAMPLE 3

Nonylphenylhexa(oxyethylene)ethyl hydrogen phosphate is prepared by heating at 60° C. an admixture of 74 grams (0.68 mole) of ethyl metaphosphate and 298 grams (0.615 mole) of nonylphenylhexa(oxyethylene)glycol for 2 1/2 hours. A 1.00 gram sample was titrated with 0.1 normal sodium hydroxide. The sample contained 1.24 milliequivalents of diester and 0.24 milliequivalents of monester indicating a 73.5 percent yield of product.

EXAMPLE 4

Isooctylphenylhexa(oxyethylene)ethyl hydrogen phosphate is prepared by heating at 60° C. for 2 hours and then to 70° C. briefly 47 grams (0.44 mole of ethyl metaphosphate and 188 grams (0.4 mole) of isooctylhexa(oxyalkylene) glycol.

What is claimed is:

1. Compounds of the formula:

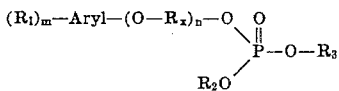

wherein $R_1$ is an alkyl radical of from one to 30 carbon atoms, $R_2$ is hydrogen, $R_x$ is an alkylene group of from two to six carbon atoms, $R_3$ is an alkyl radical of from one to 10 carbon atoms or phenyl, $n$ is an integer having a value of from 1 to 100 inclusive, $m$ is an integer having a value of from 1 to 2 inclusive, -Aryl- is phenylene, and naphthylene, and the sodium, potassium, ammonium and ethanol amino salts thereof.

2. Compounds as recited in claim 1 wherein $R_1$ is octyl or nonyl, and $m$ is 1.

3. Compounds as recited in claim 1 wherein $R_1$ is butyl or pentyl and $m$ is 2.

4. Compounds as recited in claim 1 wherein $R_x$ is an alkylene group of two carbon atoms.

5. Compounds are recited in claim 1 wherein Aryl is phenylene.

6. Compounds as recited in claim 1 wherein $n$ is an integer of from 1 to 30.

7. Compounds as recited in claim 1 wherein $R_3$ is ethyl.

8. Isooctylphenylhexa(oxyethylene)ethyl hydrogen phosphate.

9. Nonylphenylhexa(oxyethylene)ethyl hydrogen phosphate.

10. Isooctylphenylnona(oxyethylene)ethyl hydrogen phosphate.

* * * * *